(12) United States Patent
Ganesh et al.

(10) Patent No.: US 8,521,869 B2
(45) Date of Patent: Aug. 27, 2013

(54) METHOD AND SYSTEM FOR REPORTING DEFECTS WITHIN A NETWORK

(75) Inventors: Chandra Ganesh, Murphy, TX (US); Calvin Wan, Plano, TX (US); Stephen John Unger, Allen, TX (US); Kumaravel Senthivel, Murphy, TX (US)

(73) Assignee: Fujitsu Limited, Kawasaki-shi (JP)

( * ) Notice: Subject to any disclaimer, the term of this patent is extended or adjusted under 35 U.S.C. 154(b) by 393 days.

(21) Appl. No.: 12/642,285

(22) Filed: Dec. 18, 2009

(65) Prior Publication Data

US 2011/0153804 A1 Jun. 23, 2011

(51) Int. Cl.
*G06F 15/173* (2006.01)
(52) U.S. Cl.
USPC .......... 709/224; 709/222; 709/221; 709/203; 709/202
(58) Field of Classification Search
USPC .................. 709/224, 222, 221, 203, 202
See application file for complete search history.

(56) References Cited

U.S. PATENT DOCUMENTS

| | | | | |
|---|---|---|---|---|
| 4,769,761 | A | 9/1988 | Downes et al. | 364/514 |
| 5,636,008 | A | 6/1997 | LoBiondo et al. | 399/8 |
| 6,813,634 | B1 | 11/2004 | Ahmed | 709/224 |
| 6,848,203 | B2 * | 2/2005 | Hohmann et al. | 37/446 |
| 7,257,744 | B2 | 8/2007 | Sabet et al. | 714/56 |
| 7,454,653 | B2 | 11/2008 | Nicholson et al. | 714/4 |
| 7,689,873 | B1 * | 3/2010 | Bennett | 714/48 |
| 2001/0013107 | A1 * | 8/2001 | Lewis | 714/47 |
| 2004/0010584 | A1 | 1/2004 | Peterson et al. | 709/224 |
| 2004/0015579 | A1 * | 1/2004 | Cooper et al. | 709/223 |
| 2005/0080887 | A1 | 4/2005 | Lee et al. | 709/223 |
| 2005/0159927 | A1 * | 7/2005 | Cruz et al. | 702/188 |
| 2009/0204697 | A1 * | 8/2009 | Jaladanki et al. | 709/223 |
| 2010/0190488 | A1 * | 7/2010 | Jung et al. | 455/424 |
| 2011/0154099 | A1 | 6/2011 | Ganesh et al. | 714/4.1 |

OTHER PUBLICATIONS

IEEE; Configuration ITU-T Y.1731 Fault Management Functions in IEEE CFM; Cisco; pp. 18, Oct. 27, 2009.
IEEE; "IEEE 802.3ad Link Aggregation (LAG)—what it is and wht it is not"; Ottawa; pp. 13, Apr. 17, 2007.
Mohan et al.; "ITU-T SG13 & SG15 Update"; IEEE 802.1ag; pp. 14, Nov. 28, 2005.
United States Office Action; U.S. Appl. No. 12/642,365; pp. 24, Jul. 19, 2011.
United States Office Action; U.S. Appl. No. 12/642,365; pp. 17, Dec. 13, 2011.
United States Office Action; U.S. Appl. No. 12/642,365; pp. 7, Feb. 7, 2012.
United States Final Office Action; U.S. Appl. No. 12/642,365; pp. 16, Oct. 9, 2012.

* cited by examiner

*Primary Examiner* — Lan-Dai T Truong
(74) *Attorney, Agent, or Firm* — Baker Botts L.L.P.

(57) ABSTRACT

A method and system for reporting defects within a network are disclosed. In accordance with an embodiment of the present invention, a method for reporting defects within a network comprises generating a summary alarm by a network element based on defects detected within a network. The method further comprises receiving at the network element a first request for the detected defects within the network from a network management system in response to generation of the summary alarm. The method further comprises reporting the detected defects by the network element in response to the first request from the network management system.

24 Claims, 3 Drawing Sheets

METHOD AND SYSTEM FOR REPORTING DEFECTS WITHIN A NETWORK

RELATED APPLICATION

This application is related to co-pending U.S. patent application Ser. No. 12/642,365 filed Dec. 18, 2009.

TECHNICAL FIELD

The present invention relates generally to the field of communication systems and more specifically to reporting defects within a network generated by a service entity.

BACKGROUND OF THE INVENTION

A communication network typically includes network components that detect defects within the network. The network components typically detect defects using service entities including Maintenance End Groups (MEG), Service Aware Maintenance End Points (SA-MEP), Service Transparent Maintenance End Points (ST-MEP), and Remote MEP, Maintenance Intermediate Points (MIP). Each network component may include hundreds or even thousands of service entities.

The networking standards 802.1ag and Y.1731 list numerous defect types and state that these defects should be reported to a network management system. Traditionally all defects are reported as individual defect alarms to the network management system. If each defect is reported as an individual defect alarm, it is possible that thousands of defect alarms are generated either simultaneously or within a very short amount time.

When masking of the individual defect alarms is not possible, an alarm storm in the network may occur. Conventional network management systems typically cannot handle processing the number of individual defect alarms that may be generated during an alarm storm. Even if the network management system can process each individual defect alarm, handling such a large number of defect alarms may consume many resources in the network.

SUMMARY OF THE INVENTION

In accordance with the present invention, disadvantages and problems associated with previous techniques for reporting defects generated by a network entity may be reduced or eliminated.

In accordance with an embodiment of the present invention, a method for reporting defects within a network comprises generating a summary alarm by a network element based on defects detected within a network. The method further comprises receiving at the network element a first request for the detected defects within the network from a network management system in response to generation of the summary alarm. The method further comprises reporting the detected defects by the network element in response to the first request from the network management system.

In accordance with another embodiment of the present invention, a system for reporting defects within a network comprises a network element communicatively coupled to a network management system. The network element is configured to generate a summary alarm based on defects detected within a network. The network management system is configured to receive the summary alarm from the network element and generate a first request to the network element for the detected defects within the network.

In accordance with another embodiment of the present invention a network element comprises a processing unit associated with a network interface. The processing unit is configured to generate a summary alarm based on defects detected within a network. The network interface is configured to receive a first request for the defects within the network from a network management system in response to the summary alarm. The network interface is further configured to report the detected defects in response to the first request from the network management system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
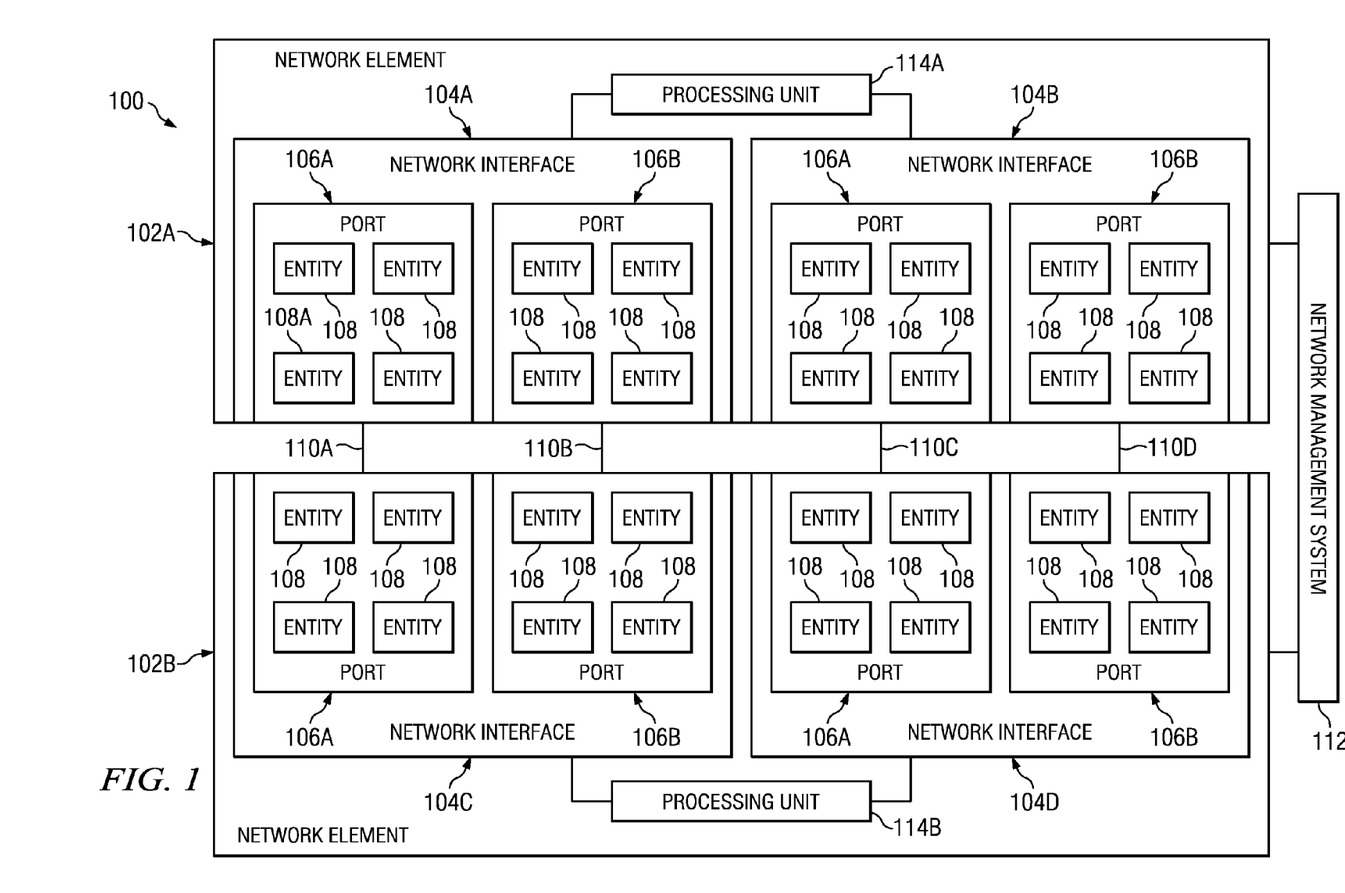
FIG. 1 illustrates a block diagram of a system for reporting defects within a network according to teachings of the present disclosure.
Figure 2:
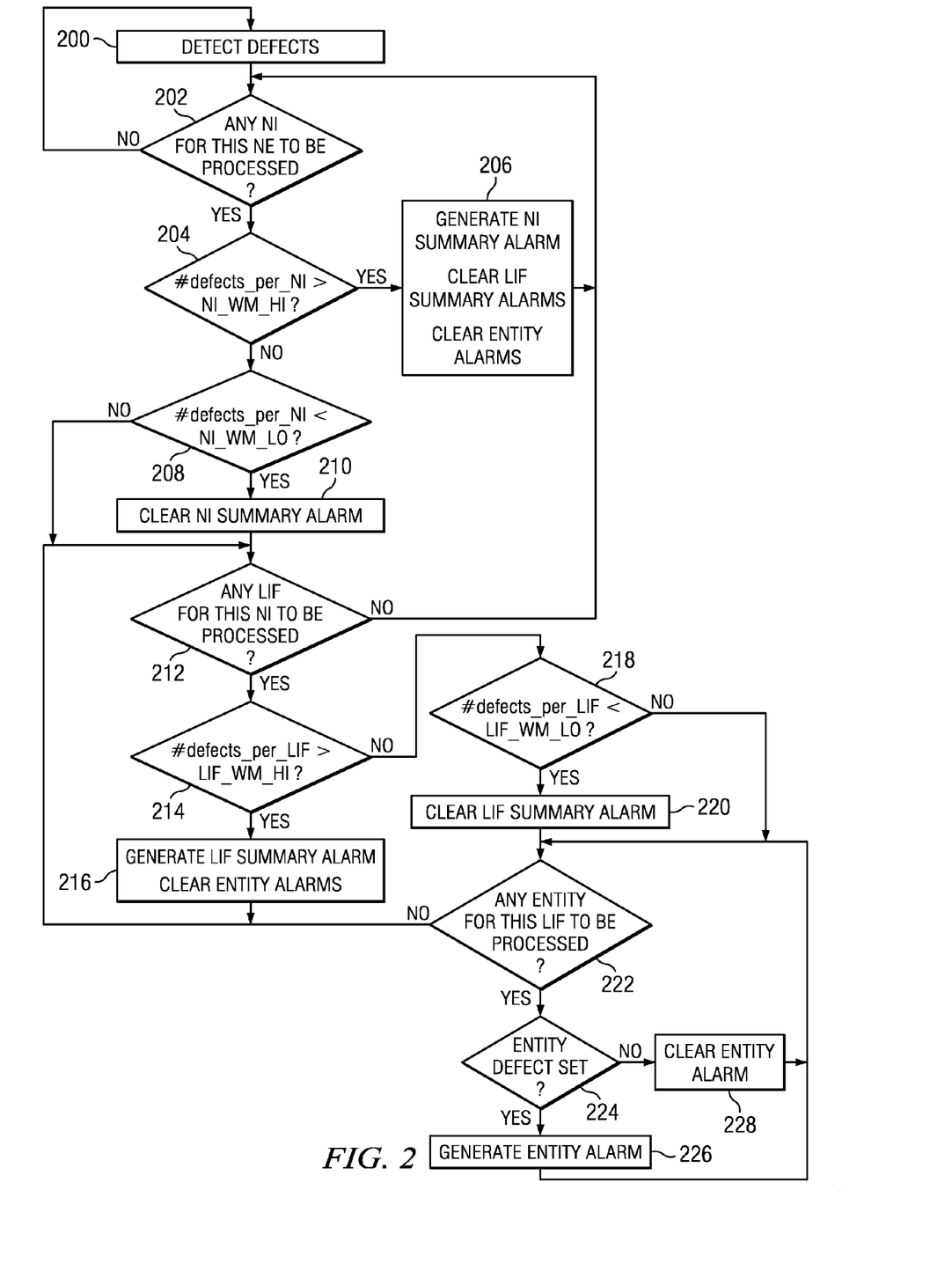
FIG. 2 illustrates a flow diagram of a method for generating a summary alarm in a network according to teachings of the present disclosure.
Figure 3:
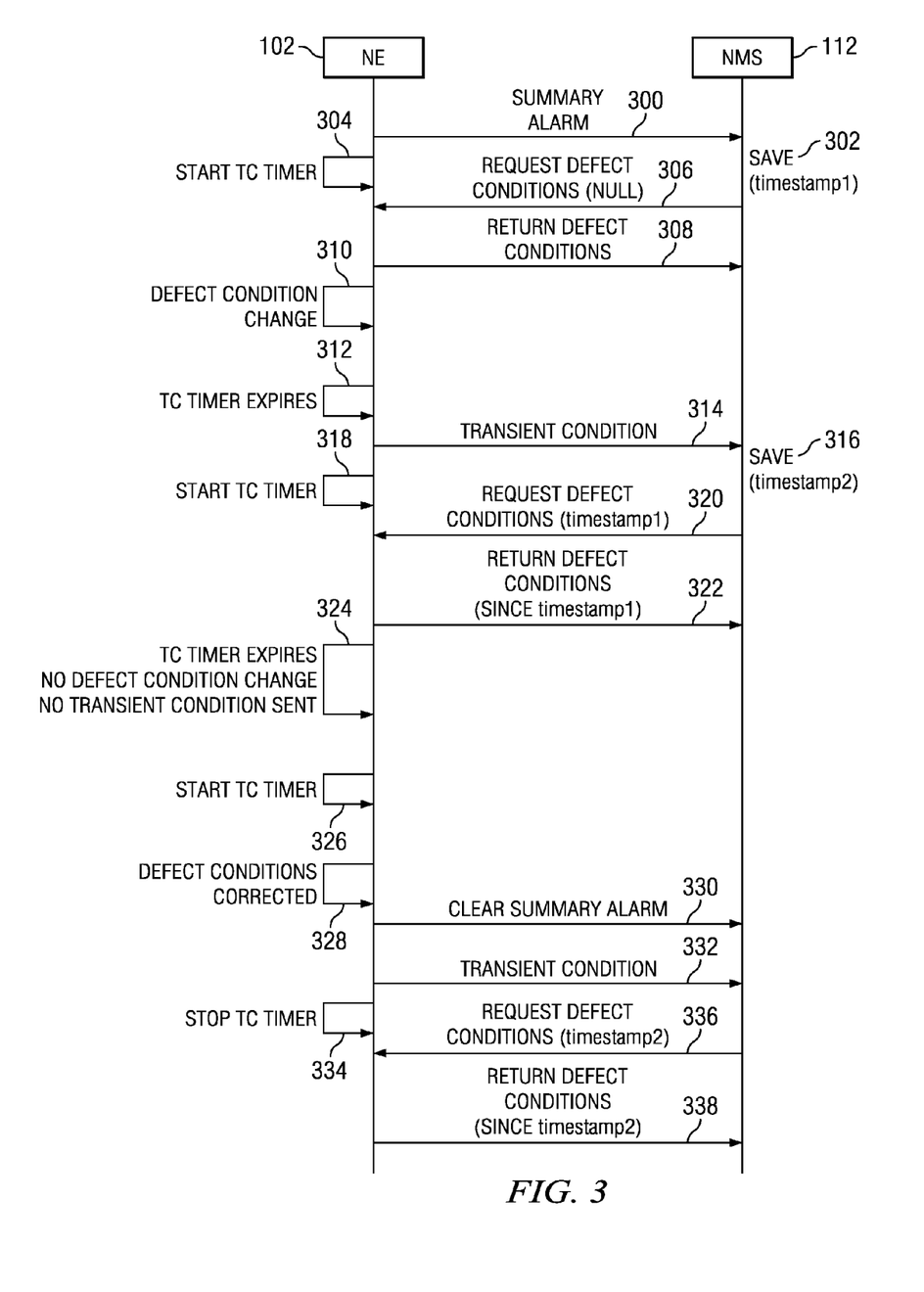
FIG. 3 illustrates a flow diagram of a method for reporting defects within a network according to teachings of the present disclosure.

Embodiments of the present invention and its advantages are best understood by referring to FIGS. 1 through 3, where like numbers are used to indicate like and corresponding parts.

FIG. 1 illustrates an example of a system 100 for reporting defects within a network in accordance with certain embodiments of the present invention. System 100 may include at least one network component. A network component may be any system, device, or apparatus used in the implementation of a network. A network component may be a physical device or a device created in software, hardware or a combination of both. Further, a network component may contain a plurality of network components. A network component may be a network element (NE) 102, a network interface (NI) 104, a port 106, a service entity 108, a network management system (NMS) 112, a processing unit 114, a logical interface (LIF) (not expressly shown), or a management controller unit (not expressly shown).

Each network element 102 may be communicatively coupled to one another via a transmission media 110. Each network element 102 may be generally configured to receive data from and/or transmit data to one or more other network elements 102. In certain embodiments, network element 102 may route data received by the network element 102 to another device (e.g., another network element 102) communicatively coupled to the network element 102. Although system 100 is depicted as having two network elements 102, it is understood that system 100 may include any number of network elements 102.

As depicted by FIG. 1 each network element 102 may include one or more network interfaces 104. Each network interface 104 may include any suitable system, apparatus, or device configured to serve as an interface between a network element 102 and a transmission medium 110. Each network interface 104 may enable its associated network element 102 to communicate to other network elements 102 using any suitable transmission protocol or standard. Network interface 104 and its various components may be implemented using hardware, software, or any combination thereof. For example, in certain embodiments, one or more of network interfaces 104 may include a network interface card. In other embodiments, one or more network of interfaces 104 may include a line card.

As depicted in FIG. 1, each of network interfaces 104 may include one or more physical ports 106. Each physical port 106 may include any system, device or apparatus configured to serve as a physical interface between a corresponding transmission medium 110 and network interface 104. In some embodiments, each physical port 104 may include an Ethernet port, a USB port, a Firewire port or a WiFi transmitter/receiver.

Additionally, a logical interface may be created to represent one or more ports 106. A logical interface may represent one or more ports such that the member ports are represented as a single logical interface. For example, a logical interface may be created in network interface 104A to represent port 106A or port 106B. A logical interface may also be created in interface 104A to represent both ports 106A and 106B. A logical interface may be implemented using software, hardware or a combination of both.

As shown in FIG. 1, the ports 106 may include one or more service entities 108. Each service entity 108 may be any system, device or apparatus used to detect defects within a network. A service entity 108 may detect defects within a network using Service Operations, Administration and Maintenance (SOAM) standards by sending continuity check messages (CCM's) and loopback messages (LBM's) over transmission medium 110. Examples of service entities 108 may include Maintenance End Groups (MEG), Service Aware Maintenance End Points (SA-MEP), Service Transparent Maintenance End Points (ST-MEP), and Remote MEP, Maintenance Intermediate Points (MIP).

Each transmission medium 110 may include any system, device or apparatus configured to couple corresponding ports 106 of network elements 102 to each other and communicate information between the corresponding ports 106. For example, a transmission medium 110 may include an optical fiber, an Ethernet cable, a T1 cable, a WiFi signal, a Bluetooth signal, or any other suitable medium.

Defects within a network may occur as network elements 102 receive and transmit data to other network elements 102. Defects within a network may include, but are not limited to, a loss of continuity between network elements 102, improper network connections between network elements 102, a loss of signal or a remote defect indication.

Each service entity 108 may be configured to detect defects within a network. For example, service entity 108A may send a CCM from port 106A in network element 102A to port 106A in network element 102B across transmission medium 110A. By sending the CCM, service entity 108A may detect a loss of continuity or an improper network connection between network element 102A and network element 102B. If service entity 108A detects a defect, that defect may be reported to a network management system 112 in the form of an individual defect alarm. Network management system 112 may include any system, device or apparatus configured to receive defects reported by the service entities 108 within a network and correct the defects within the network.

There may be thousands of service entities 108 in each network element 102 that are configured to detect defects within the network. Consequently, thousands of defect alarms may be simultaneously generated and reported to network management system 112. When an alarm storm such as this occurs, network management system 112 may not be able to handle the large number of alarms. Furthermore, an alarm storm may consume many network resources.

In order to avoid the negative consequences of an alarm storm, a network component may generate a single summary alarm to report a plurality of defects detected by the network component to the network management system 112. In one embodiment, a network component may generate a summary alarm when the number of defects detected by the network component is greater than a first threshold.

When the number of detected defects is below the first threshold, the network component may report the individual defects to the network management system 112 in the form of individual defect alarms.

A processing unit 114 may be configured to generate a summary alarm associated with a network component. Processing unit 114 may also be configured to monitor the number of defects that have been reported by the network components in order to determine the total number of defects detected within the network. Processing unit 114 may also be configured to determine the total number of defects detected by an individual network component. Processing unit 114 may further be configured to report individual defects to the network management system by generating individual defect alarms associated with network components.

The processing unit may be included within various network components. For example, a network element 102, a network interface 104, a port 106, a service entity 108, or a management control unit may include a processing unit.

Each individual component may include a processing unit configured to determine the number of defects detected, generate individual defect alarms or generate summary alarms associated with that component.

For example, a network element 102A may contain network interfaces 104A and 104B, and network interface 104A may contain a logical interface. The logical interface may contain ports 106A and 106B, and port 106A may contain a service entity 108A. Network element 102A, network interfaces 104A and 104B, the logical interface, ports 106A and 106B, and service entity 108 may all include a processing unit 114 communicatively coupled to each respective network component. Each processing unit 114 may also configured to generate individual defect alarms, generate summary alarms, or determine the number of defects detected associated with each respective network component.

Additionally, a processing unit contained in one network component may generate a summary alarm or individual defect alarm associated with another network component. For example, network element 102A may contain processing unit 114A. Network element 102A may also contain network interfaces 104A and 104B, network interface 104A may contain ports 106A and 106B, and port 106A may contain service entity 108A. Processing unit 114A may be communicatively coupled to network interface 104A. Processing unit 114A may be configured to determine the number of defects detected by network interface 104A and generate a summary alarm associated with network interface 104A, even though network interface 104A may not contain processing unit 114A.

Further, processing unit 114A may generate an individual defect alarm associated with network interface 104A. Service entity 108A may detect a defect, and processing unit 114A may be communicatively coupled to service entity 108A. Processing unit 114A may generate an individual defect alarm associated with service entity 108A. The individual defect alarm would also be associated with network interface 104A because network interface 104A contains service entity 108A.

One or more processing units 114 may perform the functions illustrated herein. In one embodiment, one processing unit 114 may determine the number of defects detected within a network and another processing unit 114 may generate the summary alarm, while another processing unit 114 may generate individual defect alarms. In another embodiment, a single processing unit 114 may perform all the functions. Processing unit 114 may be any implementation of hardware, software or combination of both used to perform calculations or generate commands within the network.

As the defects are corrected by the network management system 112, the number of defects detected by the network component may be reduced. When the number of defects detected by the network component is less than a second threshold, the summary alarm may be cleared and the network component may resume sending the individual defect alarms to the network management system 112. Processing unit 114 may be configured to clear the summary alarm.

The same network component that detects the defects may generate and clear the summary alarm. Additionally, one network component may detect defects within a network, while another network component generates and clears the summary alarm associated with the network component that detects the defects.

For example, network element 102A may generate a summary alarm associated with network interface 104A if network interface 104A detects a number of defects greater than a first threshold associated with network interface 104A. In certain embodiments, the first threshold associated with network interface 104A may be between approximately fifty (50) and sixty (60).

Network element 102A may clear the summary alarm generated for network interface 104A if the number of defects detected by network interface 104A is less than a second threshold associated with network interface 104A. In certain embodiments, the second threshold associated with network interface 104A may be between approximately thirty (30) and forty (40). Additionally, network interface 104A may generate and clear a summary alarm associated with network interface 104A.

System or network 100 may also include one or more network component hierarchal levels. A first network component may include one or more network components within the first network component. Additionally, one or more network components within the first network component may contain one or more network components. For example, as illustrated in FIG. 1, system or network 100 may include network elements 102A and 102B, network management system 112 and a processing unit (not expressly shown). Network elements 102A and 102B may include network interfaces 104A and 104B, network interfaces 104A and 104B may include a logical interface, the logical interface may include ports 106A and 106B, and ports 106A and 106B may include one or more service entities 108. Thus, the network elements 102 may be considered to be the highest level and the service entities 108 may be considered to be the lowest level within the hierarchy.

One or more network components may be configured to generate a summary alarm associated with each network component within the network component hierarchal levels. One or more network components may also be configured to generate one or more individual defect alarms associated with each network component within the network component hierarchal levels.

In one embodiment, the generation and clearing of one or more summary alarms associated with the network components within the network may be prioritized. In one embodiment, the system 100 may prioritize the summary alarms based on the hierarchy within the system 100 such that when a summary alarm is generated in a higher level, any summary alarms in a lower level included in the higher level may be cleared. For example, a summary alarm may be generated for a network interface 104A when the number of defects detected is above a first threshold associated with network interface 104A. If a summary alarm was previously generated for either of ports 106A or 106B, the port summary alarm will be cleared when the network interface summary alarm is generated. Additionally, any individual defect alarms generated by service entities 108 will be cleared when a port summary alarm is generated.

FIG. 2 illustrates a flow diagram of a method for generating a summary alarm in a network. The method in FIG. 2 illustrates a prioritization of summary alarms associated with network components according to network hierarchal levels.

In the particular embodiment illustrated by FIG. 2, a network component may generate a summary alarm associated with one or more network components within one or more network hierarchal levels. The first network component may be a network interface included in a network element, with the network element being in a first hierarchical level. The network interface may include one or more ports represented by one or more logical interfaces. The one or more logical interfaces may be in a second hierarchal level that is below the first hierarchal level because the network interface contains the one or more logical interfaces. Also, the one or more logical interfaces may contain one or more service entities. The one or more service entities may be in a third hierarchal level that is below the first and second hierarchal levels because the network interface may contain the one or more logical interfaces that contain the one or more service entities.

According to the embodiment in FIG. 2, network components detect defects within the network at step 200. In this particular embodiment, the network interface is the highest level and the service entity is the lowest level. In other embodiments, other network components may be included in the hierarchy either above or below the network interface.

At step 202 a network component determines if a network interface within a network element should be processed. If a particular network interface should be processed, the method moves to step 204. In one embodiment, network components may be processed by determining if the service entities within the network components have detected defects. If no network components need to be processed, the method returns to step 200.

At step 204, a network component determines whether the number of defects detected by the network interface is greater than a first threshold associated with the network interface. The first threshold associated with the network interface may be a Network Interface High Watermark (NI_WM_HI), which may be a number between approximately fifty (50) and approximately sixty (60). If the number of defects detected by the network interface is greater than the network interface high watermark, a network component may generate a summary alarm associated with the network interface at step 206.

When the network component generates the summary alarm associated with the network interface, the network component also clears any summary alarms associated with any network components in a lower hierarchical level included within the network interface (e.g., the logical interfaces within the network interface). For example, a network component may have generated a summary alarm associated with a logical interface within the network interface. When the network component generates the summary alarm for the network interface, the network component also may clear the summary alarm for the logical interface within the network interface.

When the network component generates the summary alarm associated with the network interface, it may also clear any individual defect alarms associated with the network interface. For example, the network interface may contain a logical interface and the logical interface may include a service entity. The service entity may have detected a defect within the network and a network component may have generated an individual defect alarm associated with the service entity. Because the service entity is included in the logical interface and the network interface, the defect alarm associated with the service entity is also associated with the logical interface and the network interface. Therefore, when the network clears the individual defect alarms associated with the network interface, the network component may clear the defect alarm associated with the service entity contained in the network interface.

Following step 206, the method returns to step 202. A network component may again determine if a network interface or group of network interfaces needs to be processed at step 202.

Returning to step 204, if the number of defects detected by the network interface is less than or equal to the Network Interface High Watermark, the method moves to step 208 where a network component may determine if the number of defects detected by the network interface is less than a second threshold associated with the network interface. The second threshold associated with the network interface may be a Network Interface Low Watermark (NI_WM_LO). The Network Interface Low Watermark may be a number between approximately thirty (30) and forty (40). The values of the Network Interface High Watermark and the Network Interface Low Watermark may vary greatly according to different network implementations, requirements, and capabilities.

At step 208, if the number of defects detected by the network interface is less than the Network Interface Low Watermark, the method moves to step 210. At step 210, a network component may clear the summary alarm associated with the network interface, and the method moves to step 212. After a summary alarm is generated, a network component may correct defects detected by a network interface. As such, the network component may clear these summary alarms if the number of defects detected by the network interface or group of network interfaces is reduced. At step 208, if the number of defects detected by the network interface is greater than or equal to the Network Interface Low Watermark, the method skips step 210 and moves to step 212.

At step 212 a network component may determine if any logical interfaces within the network interface should be processed. If a logical interface should be processed, the method moves to step 214. In one embodiment, network components may be processed by determining if the service entities within the logical interfaces have detected defects. If no logical interfaces need to be processed, the method may return to step 202.

At step 214, a network component may determine if the number of defects detected by the logical interface is greater than a first threshold associated with the logical interface. The first threshold associated with the logical interface may be a Logical Interface High Watermark (LIF_WM_HI).

The Logical Interface High Watermark may be a number that is lower than the Network Interface High Watermark of the network interface that contains the logical interface. Therefore, a network component may generate a summary alarm for a logical interface within a network interface at times when the number of defects detected by the network interface may not trigger a summary alarm associated with the network interface. For example the Network Interface High Watermark may be a number between approximately fifty (50) and sixty (60) and the Logical Interface High Watermark may be a number between twenty (20) and (30).

If the number of defects detected by the logical interface is greater than the Logical Interface High Watermark, the method may move to step 216 where a network component may generate a summary alarm associated with the logical interface being processed. When the network component generates a summary alarm for the logical interface, the network component may also clear any individual defect alarms associated with the logical interface. After step 216, the method may return to step 212.

If the number of defects detected by the logical interface is not greater than the Logical Interface High Watermark, the method may move from step 214 to step 218. At step 218, a network component determines if the number of defects detected by the logical interface is less than a second threshold associated with the logical interface. The second threshold associated with the logical interface may be a Logical Interface Low Watermark (LIF_WM_LO).

The value of the Logical Interface Low Watermark may be a value less than the Logical Interface High Watermark, and may depend on various factors including the number of ports represented by the logical interface and the number of service entities associated with each port within the logical interface. For example, the Logical Interface High Watermark may be a number between approximately twenty (20) and thirty (30) and the Logical Interface Low Watermark may be a number between approximately ten (10) and twenty (20). The values of the Logical Interface High Watermark and the Logical Interface Low Watermark may vary greatly according to different network implementations, requirements, and capabilities.

If the number of defects detected by the logical interface is less than the Logical Interface Low Watermark, the method may move to step 220. At step 220, a network component may clear a summary alarm associated with the logical interface and the method moves to step 222. If the number of defects detected by the logical interface is greater than or equal to the Logical Interface Low Watermark, the method skips step 220 and moves from step 218 to step 222.

At step 222, a network component determines if any service entities within the logical interface should be processed. If no service entities within the logical interface should be processed, the method moves from step 222 to step 202. If a service entity within the logical interface does need to be processed, the method moves from step 222 to step 224.

At step 224, a network component determines if a service entity has detected a defect. If a service entity has detected a defect, the method moves from step 224 to step 226 where a network component may generate an individual defect alarm associated with the service entity that detected the defect. The individual defect alarm may be used report the defect within the network to a network management system. After step 226, the method returns to step 222.

Returning to step 224, if a network component determines that the service entity has not detected a defect in the network, the method moves from step 224 to step 228. At step 228 a network component may clear an individual defect alarm that may be associated with the service entity. For example, a service entity may have detected a defect within the network and generated an individual defect alarm associated with that entity. The defect detected by the entity may have been corrected, and the entity may no longer detect any defects. A network component may now clear the individual defect alarm associated with that entity. Following step 228 the method returns to step 222.

Although the method illustrated by FIG. 2 has been described with specific network components, other components may be used to carry out the steps illustrated therein.

FIG. 3 illustrates a method for reporting defects detected within a network using a summary alarm. In typical network systems, when a defect is detected and a defect alarm is generated, the defect is automatically reported to a network component (e.g., a network management system (NMS)) without any action by the network management system itself. As described above, an alarm storm can greatly limit the resources available to a network management system. It may be advantageous not only to generate a summary alarm, but to have the network management system generate a request to the network elements for the defects instead of having the defects automatically reported to the network management system.

In FIG. 3 a network element (NE) 102 is depicted as being communicatively coupled to a network management system (NMS) 112. Network element 102 is depicted as generating a summary alarm and a network management system (NMS) 112 is depicted as receiving the summary alarm. Although the method in FIG. 3 is depicted as such, a plurality of network components configured to carry out the steps in FIG. 3 may be used.

As illustrated in FIG. 3, network element 102 may generate a summary alarm if the number of detected defects is greater than a first threshold, and network element 102 may send the summary alarm to network management system 112 at step 300. At step 302, network management system 112 may save a first timestamp upon receiving the summary alarm. The first timestamp may give network management system 112 and network element 102 a reference of when the summary alarm was generated. Although network management system 112 is depicted as saving the first timestamp, network element 102 or another network component may also save the first timestamp.

After sending the summary alarm to network management system 112, network element 102 may receive a request from network management system 112 for the detected defects within the network at step 306. Network management system 112 may send the request in response to the summary alarm. At step 308, network element 102 reports the detected defects to network management system 112 in response to the request from network management system 112.

After network element 102 sends the summary alarm to network management system 112, changes may occur in the defects within the network. A change in the network may be an additional defect being detected within the network. Another change may be a defect in the network being corrected. Network management system 112 may need to be notified that a change may have occurred in the defects within the network after the summary alarm is generated so that network management system 112 can properly attend to the network. It may be advantageous for network management system 112 and network element 102 to have a reference of when the summary alarm was generated.

To facilitate tracking changes in defects within the network, network element 102 may also start a first transient condition timer at step 304 upon sending the summary alarm at step 300. While the first transient condition timer is running, network element 102 may detect a change in the defects within the network at step 310. For example, after generating the summary alarm, network element 102 may have detected another defect within the network. As another example, after receiving the summary alarm, network management system 112 may have corrected a defect within the network, therefore causing a defect alarm associated with network element 102 to be cleared. Both of these events may be changes in the network that occurred after the summary alarm was generated.

After the first transient condition timer expires in step 312, network element 102 may generate a first transient condition and send the first transient condition to network management system 112 in step 314. Network element 102 may generate the first transient condition to indicate that a change in the defects within the network has occurred after the summary alarm was generated.

In response to the first transient condition, network element 102 may receive a request from network management system 112 for a change in the defects within the network after the summary alarm was generated. Network management system 112 and network element 102 may use the first timestamp saved at step 302 as a reference to indicate when the summary alarm was generated. Therefore, network element 102 may receive a request from network management system 112 for the change in defects within the network that have occurred since the first timestamp at step 320. Network element 102 may report the change in defects within the network since the first timestamp at step 322. Because the first timestamp may be associated with the summary alarm, network element 102 may report the change in defects within the network that occurred after the summary alarm was generated by reporting the change in defects within the system since the first timestamp.

Network management system 112 may save a second timestamp at step 316, after receiving the first transient condition. The second timestamp may be saved to indicate when network management system 112 last received an update on changes in defects within the network (e.g., to indicate when the first transient condition occurred).

Additionally, network element 102 may generate a first transient condition after the first transient condition timer expires without determining if a change in defects within the network has occurred since the first transient condition timer was started. Network element 102 may generate the first transient condition to indicate to network management system 112 that network management system 112 may need to request the change in defects within the network after receiving the summary alarm.

In another embodiment, network management system 112 may start a first transient condition timer upon receiving the summary alarm. When the first transient condition timer generated by network management system 112 expires, network management system 112 may request the changes in defects within the networks after the first transient condition timer was started, which may correspond with when the summary alarm was generated. In this particular embodiment, network management system 112 may start a second transient condition timer after the first transient condition timer expires. Network management system 112 may save a second timestamp associated with when the first transient condition timer expires. The second timestamp may be used as a reference to indicate to network management system 112 when it last checked for a change in defects.

Returning now to step 318, after the first transient condition timer expires at step 312, a second transient condition timer may start at step 318. At step 324, the second transient condition timer expires. No changes in the defects within the network may have occurred from the time the second transient condition timer started and expired. In one embodiment, as illustrated in step 324, network element 102 may not generate a transient condition because no changes occurred.

In another embodiment, network element 102 may send a second transient condition to network management system 112 to prompt network management system 112 to request an update in the change in defects since the first transient condition. Upon receiving the request, network element 102 may send network management system 112 a report indicating that no changes in defects have occurred since the first transient condition.

Returning to step 326, network element 102 may start a third transient condition timer after the second transient condition timer expires. At step 328, network element 102 may detect that one or more defects have been corrected. The number of defects may be lower than a second threshold and network element 102 may clear the summary alarm. Network element 102 may send a clear summary alarm signal to network management system 112 at step 330.

At step 332, network element 102 may generate a second transient condition because a change (e.g., clearing the summary alarm) in the defects within the network has occurred after the first transient condition was generated. A second timestamp associated with the first transient condition may have been saved at step 316. Therefore, network element 102 may generate a second transient condition because a change in the defects within the network has occurred since the second timestamp.

Network element 102 may receive in response to the second transient condition a request from network management system 112 for the change in defects since the second timestamp at step 336. At step 338, network element 102 may report to network management system 112 the change in defects within the network since the second timestamp. At step 334, the third transient condition timer may be stopped.

Certain embodiments of the invention may provide one or more technical advantages, including the ability to mask multiple defects within a network by generating a single summary alarm when the number of defects is above a threshold. By reducing the number of alarms that need to be maintained and reported, the resources dedicated to defect reporting and servicing may be reduced.

Another advantage may be that a first network component (e.g., a network management system) may request a report of the defects within the network instead of a second network component (e.g., a network element) proactively reporting defects to the first network component. A network management system may better control its use of resources by requesting defect reports instead of having defects proactively pushed to the network management system by a network element.

Although this disclosure has been described in terms of certain embodiments, alterations and permutations of the embodiments will be apparent to those skilled in the art. Accordingly, the above description of the embodiments does not constrain this disclosure. Other changes, substitutions and alterations can be made herein without departing from the spirit and scope of the invention as defined by the following claims.

What is claimed is:

1. A method for reporting defects within a network comprising:
    detecting by a network element that a plurality of defects have occurred within the network;
    determining by the network element that the number of defects is greater than a threshold;
    generating a single summary alarm by the network element based on the plurality of defects;
    sending the summary alarm from the network element instead of an individual defect alarm for each of the plurality of defects;
    receiving at the network element a first request from a network management system for the detected defects within the network in response to generation of the summary alarm; and
    reporting the detected defects by the network element in response to the first request from the network management system.

2. The method of claim 1, further comprising detecting by the network element a change in the detected defects within the network.

3. The method of claim 1, further comprising generating by the network element a transient condition if a change in the detected defects within the network occurs after the summary alarm is generated.

4. The method of claim 3, further comprising:
    receiving at the network element a second request from the network management system for the change in the detected defects within the network in response to the transient condition; and
    reporting by the network element the change in the detected defects in response to the second request from the network management system.

5. The method of claim 1, further comprising:
    initiating a transient condition timer in the network element; and
    generating by the network element a transient condition when the transient condition timer expires if a change in the detected defects within the network occurs after initiation of the transient condition timer.

6. The method of claim 1, further comprising:
    saving by the network management system a timestamp associated with the summary alarm; and
    generating by the network element a transient condition if a change in the detected defects within the network occurs after the timestamp was saved.

7. The method of claim 1, further comprising:
    generating by the network element a first transient condition if a first change in the detected defects within the network occurs after the summary alarm is generated;
    saving by the network element a timestamp associated with the first transient condition; and
    generating by the network element a second transient condition if a second change in the detected defects within the network occurs after the timestamp was saved.

8. A system for reporting defects within a network, comprising:
    a network element comprising at least one network interface that includes one or more physical ports each coupled to a transmission medium that enables the network element to receive data from and transmit data to one or more other network elements, the network element configured to:
        detect that a plurality of defects have occurred within the network;
        determine that the number of defects is greater than a threshold; and
        generate a single summary alarm based on the plurality of defects; and
        report the detected defects to a network management system in response to a request from the network management system;
    the network management system communicatively coupled to the network element and configured to:

receive the summary alarm from the network element instead of receiving an individual defect alarm for each of the plurality of defects; and generate a first request to the network element for the detected defects within the network in response to receiving the summary alarm.

9. The system of claim 8, wherein the network element is further configured to report the detected defects by the network element in response to the first request from the network management system.

10. The system of claim 8, wherein the network element is further configured to detect a change in the detected defects within the network.

11. The system of claim 8, wherein the network element is further configured to generate a transient condition if a change in the detected defects within the network occurs after the summary alarm is generated.

12. The system of claim 11, wherein:

the network management system is further configured to:
receive the transient condition from the network element; and
generate a second request to the network element for the change in detected defects within the network in response to the transient condition; and
the network element is further configured to report the change in the detected defects in response to the second request from the network management system.

13. The system of claim 8, wherein the network element is further configured to:
initiate a transient condition timer; and
generate a transient condition when the transient condition timer expires if a change in the detected defects within the network occurs after initiation of the transient condition timer.

14. The system of claim 8, wherein:
the network management system is further configured to save a timestamp associated with the summary alarm; and
the network element is further configured to generate a transient condition if a change in the detected defects within the network occurs after the timestamp was saved.

15. The system of claim 8, wherein:
the network element is further configured to generate a first transient condition if a first change in the detected defects within the network occurs after the summary alarm is generated; and
the network management system is further configured to save a timestamp associated with the first transient condition.

16. The system of claim 15, wherein the network element is further configured to generate a second transient condition if a second change in the detected defects within the network occurs after the timestamp was saved.

17. A network element, comprising:
a processing unit configured to:
detect that a plurality of defects have occurred within a network;
determine that the number of defects is greater than a threshold; and
generate a single summary alarm based on the plurality of defects; and
send the single summary alarm instead of an individual defect alarm for each of the plurality of defects over the network to a network management system;
a network interface comprising one or more physical ports each coupled to a transmission medium that enables the network element to receive data from and transmit data to one or more other network elements, the network interface, associated with the processing unit and configured to:
receive a first request for the detected defects within the network from the network management system in response to the summary alarm; and
report the detected defects in response to the first request from the network management system.

18. The network element of claim 17, wherein the processing unit is further configured to detect a change in the detected defects within the network.

19. The network element of claim 17, wherein the processing unit is further configured to generate a transient condition if a change in the detected defects within the network occurs after the summary alarm is generated.

20. The network element of claim 19, wherein the network interface is further configured to:
receive from the network management system a second request for the change in the detected defects within the network in response to the transient condition; and
report the change in the detected defects in response to the second request from the network management system.

21. The network element of claim 17, wherein the processing unit is further configured to:
initiate a transient condition timer; and
generate a transient condition when the transient condition timer expires if a change in the detected defects within the network occurs after initiation of the transient condition timer.

22. The network element of claim 17, wherein the processing unit is further configured to save a timestamp associated with the summary alarm.

23. The network element of claim 22, wherein the processing unit is further configured to generate a transient condition if a change in the detected defects within the network occurs after the timestamp was saved.

24. The network element of claim 17, wherein the processing unit is further configured to:
generate a first transient condition if a first change in the detected defects within the network occurs after the summary alarm is generated;
save a timestamp associated with the first transient condition; and
generate a second transient condition if a second change in the detected defects within the network occurs after the timestamp was saved.

* * * * *